(12) United States Patent
Dicovitsky et al.

(10) Patent No.: US 8,782,782 B1
(45) Date of Patent: Jul. 15, 2014

(54) COMPUTER SYSTEM WITH RISK-BASED ASSESSMENT AND PROTECTION AGAINST HARMFUL USER ACTIVITY

(75) Inventors: Gregory Dicovitsky, Andover, MA (US); Robert William Bryan, Seattle, WA (US)

(73) Assignee: EMC Corporation, Hopkinton, MA (US)

( * ) Notice: Subject to any disclaimer, the term of this patent is extended or adjusted under 35 U.S.C. 154(b) by 501 days.

(21) Appl. No.: 12/978,096

(22) Filed: Dec. 23, 2010

(51) Int. Cl.
*H04L 29/06* (2006.01)

(52) U.S. Cl.
USPC ............... 726/22; 709/224; 713/166; 706/48

(58) Field of Classification Search
CPC .......................... H04L 67/22; H04L 63/1425
See application file for complete search history.

(56) References Cited

U.S. PATENT DOCUMENTS

| | | | |
|---|---|---|---|
| 7,401,230 B2* | 7/2008 | Campbell et al. | 713/190 |
| 7,409,357 B2* | 8/2008 | Schaf et al. | 705/7.28 |
| 7,490,356 B2* | 2/2009 | Lieblich et al. | 726/25 |
| 7,865,958 B2* | 1/2011 | Lieblich et al. | 726/25 |
| 8,185,930 B2* | 5/2012 | Alperovitch et al. | 726/1 |
| 8,621,559 B2* | 12/2013 | Alperovitch et al. | 726/1 |
| 2003/0172167 A1* | 9/2003 | Judge et al. | 709/229 |
| 2003/0233575 A1* | 12/2003 | Syrjanen et al. | 713/201 |
| 2005/0223220 A1* | 10/2005 | Campbell et al. | 713/164 |
| 2005/0234866 A1* | 10/2005 | Kyler | 707/1 |
| 2006/0020814 A1* | 1/2006 | Lieblich et al. | 713/182 |
| 2008/0082380 A1* | 4/2008 | Stephenson | 705/7 |
| 2008/0148398 A1* | 6/2008 | Mezack et al. | 726/22 |
| 2009/0119740 A1* | 5/2009 | Alperovitch et al. | 726/1 |
| 2009/0178142 A1* | 7/2009 | Lieblich et al. | 726/25 |
| 2010/0121929 A1* | 5/2010 | Lin | 709/206 |
| 2011/0054961 A1* | 3/2011 | DelZoppo et al. | 705/7 |
| 2012/0216248 A1* | 8/2012 | Alperovitch et al. | 726/1 |

* cited by examiner

*Primary Examiner* — Michael R Vaughan
(74) *Attorney, Agent, or Firm* — BainwoodHuang

(57) ABSTRACT

A computer system is protected against harmful activity of a privileged user. A risk agent is deployed which is communicatively coupled to a risk engine, the risk engine being operative in response to queries to perform model-based risk assessments of activities and to provide responses conveying risk assessment results. The risk agent monitors computer system activity of the privileged user to detect initiation of a sensitive operation, and formulates and sends a query to the risk engine requesting risk assessment. The risk agent takes an appropriate control action based on a risk assessment result in a response to a query. The control action may be one of allowing the sensitive operation to proceed; preventing the sensitive operation from proceeding; issuing a notification that the sensitive computer operation is proceeding; and obtaining further confirmation as a condition to allowing the sensitive operation to proceed. By this method, security of the computer system is enhanced, especially against inadvertent or intentional harmful activity of a privileged user.

20 Claims, 2 Drawing Sheets

COMPUTER SYSTEM WITH RISK-BASED ASSESSMENT AND PROTECTION AGAINST HARMFUL USER ACTIVITY

BACKGROUND

The invention is related to the field of computer system security.

Existing computer systems typically employ a variety of security-related functions for protection against potentially harmful user activity. For example, user authentication is often employed which requires a user to provide a password or other credential which establishes the user's identity, protecting against the possibility of an intruder masquerading as an authorized user and engaging in harmful activity. Another type of function, referred to as access control, enforces limitations on the activities that authorized users can engage in. In one common example, access controls may be placed on certain storage devices or file system directories so that only certain users are permitted to access the data therein. Such access controls can serve to protect sensitive data from being accidentally deleted or used for an improper purpose by a user who has no legitimate need for access to the data. One dimension of access control may regard a type of user. Users can include typical or "non-privileged" users, who simply use a system, and administrative or privileged users who engage in more sensitive operations such as configuring a system or taking other system-wide action. Privileged users, who are normally selected in part based on perceived trustworthiness, are by definition granted greater access to system operational functions than is granted to non-privileged users.

A computer system may range in complexity from a single computerized device (e.g., a personal computer or standalone server computer) to a large network of numerous interconnected computerized devices. Security functions may be applied at the level of an individual computer or system-wide. In one pertinent example, a so-called storage area network or SAN is a specialized computer system having server-type host computers and large-capacity storage systems connected by a high-bandwidth data network. A SAN is typically managed using a SAN management application (executing on a management station, for example) and management agents executing on managed components within the SAN (e.g., hosts, storage systems, network switches, etc.). Management functions may include sensitive operations such as dismounting a disk drive, making it unavailable to applications executing on the host computer(s) of the SAN. Security functions may be used to ensure that a user is properly authenticated and has proper access privileges before the user is permitted to initiate such a sensitive operation.

A technique known as multi-factor authentication has been used for improved security in certain settings, notably for web-based services such an online banking. These techniques are directed to verifying the identity of a user, taking into account things like a network address of a computer being used by the user, a time of access, type and size of financial transaction, etc. Pertinent data is gathered and provided to a multi-factor authentication system that uses a rule-based approach to assessing whether a user is permitted access to a system based in part on the circumstances of the access.

SUMMARY

Existing security functions in computer systems may not provide adequate protection against certain types of harmful activity, notably activity that is engaged in by a privileged user. By definition, a privileged user can engage in sensitive computer system operations that are not permitted to be performed by non-privileged users. A privileged user may accidentally or intentionally engage in harmful activities, such as invoking sensitive operations that will delete a large portion of user data, disable access to devices, etc. In some cases such harmful activities can cause tremendous problems and incur substantial cost. For example, if a privileged user engages in activity that renders an online banking application non-functional, it can cause severe problems for customers and others who rely on the availability of the service, and may expose the bank which operates the service to fines or other monetary penalties.

A method is disclosed for protecting a computer system against potentially harmful activity of a privileged user who is authorized to perform sensitive computer system operations which non-privileged users of the computer system are not authorized to perform. The method includes deploying a risk agent in the computer system, the risk agent being communicatively coupled to a risk engine, which is a rules-based expert system where the risk model is a collection of rules. The risk engine is operative in response to queries from the risk agent to perform model-based risk assessments of activities identified in the queries and to provide responses conveying risk assessment results. During operation, the risk agent monitors computer system activity of the privileged user to detect initiation of a sensitive computer system operation, and formulates and sends a query to the risk engine requesting risk assessment for the sensitive computer system operation. The risk agent receives a response to the query from the risk engine, and takes an appropriate control action based on a risk assessment result in the response. The control action may be one of allowing the sensitive computer system operation to proceed; preventing the sensitive computer system operation from proceeding; issuing a notification that the sensitive computer operation is proceeding, and obtaining further confirmation as a condition to allowing the sensitive computer system operation to proceed. For example, the risk agent may communicate with a system administrator or another privileged user of the computer system to verify that the sensitive operation may be performed. By this method, security of the computer system is enhanced, especially against inadvertent or intentional harmful activity of such a privileged user.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
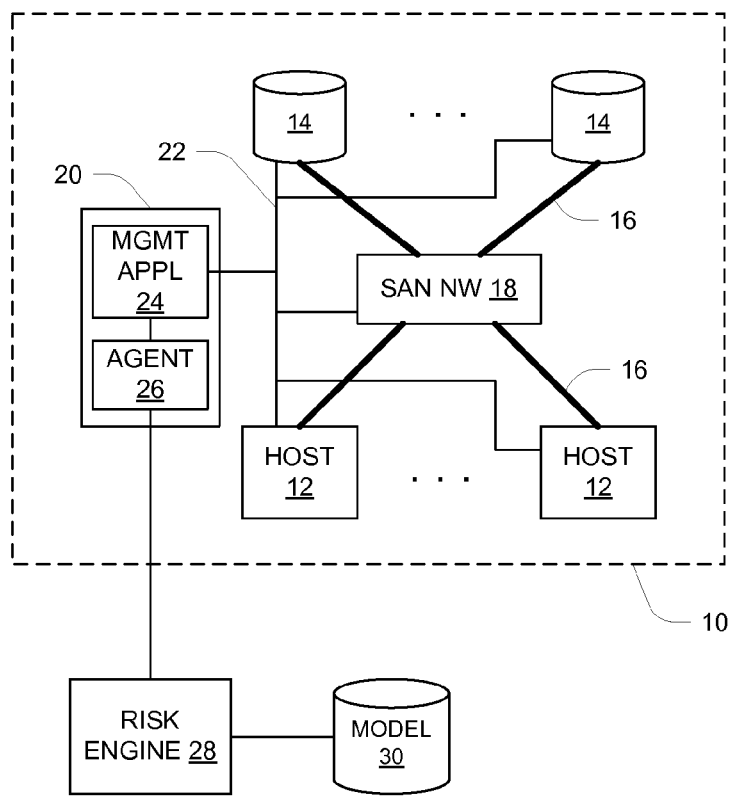
FIG. 1 is a block diagram of a computer system.

FIG. 1 shows a computer system in the form of a storage area network (SAN) 10. The SAN 10 includes one or more host computers (HOSTs) 12 and storage systems 14 having respective connections 16 to a SAN network (SAN NW) 18. The connections 16 and SAN network 18 carry storage related commands and data between the hosts 10 and storage systems 12 as generally known in the art. The SAN 10 also includes components for system management of the SAN 10, shown as a management station 20 and management network 22. As shown, the management station 20 includes a SAN management application (MGMT APPL) 24 as well as a risk agent (AGENT) 26. The risk agent 26 has a connection to a risk engine 28 which is a computer providing security related services using a risk model 30 as described below.

The hosts 12, storage systems 14 and management station 20 are typically computerized devices which include one or more processors, memory, storage (e.g., magnetic or flash memory storage), and input/output circuitry all coupled together by one or more data buses, along with program instructions which are executed by the processor out of the memory to perform certain functions which are described herein. The input/output circuitry includes network interface circuitry coupling the device to the connections 16 and/or management network 22. Part or all of the functions described below may be depicted by corresponding blocks in the drawings, and these should be understood to cover a computerized device programmed to perform the identified function.

Figure 2:
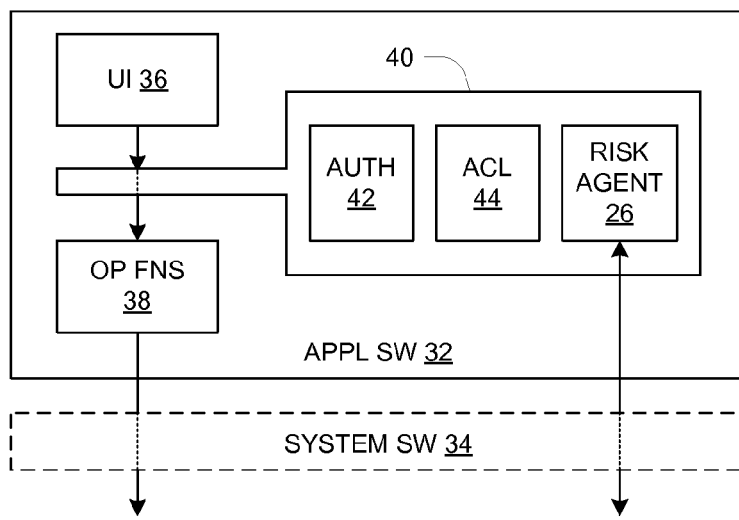
FIG. 2 is a block diagram of operating software of a management station.

FIG. 2 depicts certain operating software forming part of the management station 20, divided into application software (APPL SW) 32 and system software (SYSTEM SW) 34 such as an operating system, virtual machine monitor or "hypervisor" (e.g., VMWare®), etc. The application software 32 realizes the SAN management application 24 and risk agent 26 (FIG. 1). It includes a user interface (UI) 36 and operating functions (OP FNS) 38 that provide the desired SAN management functionality. The operating functions 38 include a variety of functions as generally known in the art, such as device and connectivity discovery; configuration; monitoring (including statistics gathering); etc. Included in the operating functions 38 are operations that are deemed "sensitive", e.g., operations that have the power to significantly affect the ability of the SAN 10 to operate as desired or that may compromise user data. Examples of such sensitive system operations include operations that control whether a host 10 has access to data in a given storage device 12; operations that delete or modify user data or entire devices on which user data is stored; operations that provide access to the SAN 10 from external computers; etc. It will be appreciated that if such sensitive operations are misused (e.g., with malicious intent), serious disruption and functional damage to the SAN 10 could be caused.

The application software 32 includes security or protective functions 40 that function as "gatekeepers" between the user interface 36 and the operating functions 38, i.e., that regulate whether and how the operating functions 38 can be used by a given user. Conventional examples of such protective functions include an authentication function (AUTH) 42 and an access control (ACL) function 44. The authentication function 42 serves to establish that a user actually is whoever the user is claiming to be. The authentication function 42 may require that a user "log on" as an established known user and that the user provide a password or other credential which is unique to that known user. Any user who cannot be authenticated is given either no access or only very limited access to functionality of the management application 24. The access control function 44 serves to define and enforce limits on the functions that can be performed by users once they have been properly authenticated. Some users may be permitted only to monitor network operation or other "read only" types of functions, whereas other users (often referred to as "administrators" or "privileged users") are allowed to perform a much broader range of functions including those that modify the structure and/or functioning of the SAN 10.

As shown in FIG. 2, the risk agent 26 forms part of the security/protective functions 40, and it provides security functionality beyond that provided by the authentication function 42 and access control function 44. The risk agent 26 observes operation, identifies operations (or attempts to initiate operations) that meet a criteria of riskiness, and initiates additional security-related processing when the risk criteria is exceeded in order to address the perceived risk. It performs these functions in conjunction with the risk engine 28 and risk model 30. The risk engine 28 is operative in response to queries from the risk agent 26 to perform model-based risk assessments of activities identified in the queries, and to provide responses conveying risk assessment results. In one embodiment, the risk engine 28 and risk model 30 may operate in a manner analogous to an authentication platform known as "RSA Adaptive Authentication", with the risk model 30 specifically tailored to the types of potentially harmful operations that can be performed in the SAN 10.

It is important to note that the inhibitory function of the risk agent 26 is distinct from that provided by the authentication function 42 and access control function 44. A given user may be properly authenticated and may be permitted to perform a certain operating function 38 by the access control function 44, yet be prevented from performing that function by operation of the risk agent 26 based on a risk assessment made using various information. Examples are described below. This additional layer of security processing can provide protection against the problem of careless or malicious privileged users discussed above.

As shown in FIG. 2, external communications of the operating functions 38 and risk agent 26 generally pass through the system software 34 (e.g., using library functions for transferring a data message to/from another device via a connection 16 or network 22). System software such as system software 34 typically has its own protective or security functions analogous to the security functions 40, and thus it can similarly benefit from use of a risk agent similar to the risk agent 26. This use of a risk agent is discussed below. With respect to the SAN management station 20 or similar application as depicted in FIG. 2, it is contemplated that in some embodiments there may be one or more additional risk agents deployed at different operating layers as desirable, for example as part of system software 34 (e.g., an operating system and/or a virtual machine monitor).

Figure 3:
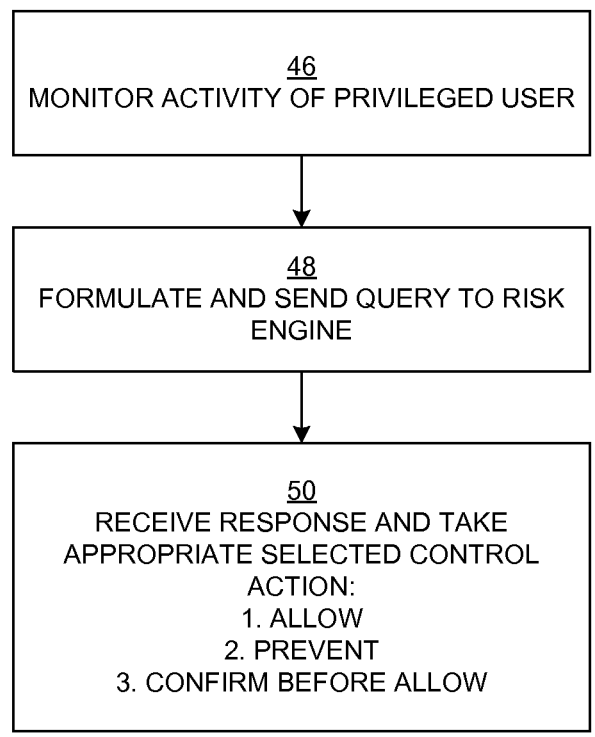
FIG. 3 is a flow diagram of security-related operation of a computer system.

FIG. 3 is a flow diagram depicting pertinent operation of the SAN management station 20. It will be appreciated that most (and in some cases all) of the illustrated functionality is performed by the risk agent 26 which is deployed in the SAN management station 20. The risk agent 26 may use the services of separate software to effect a control action (discussed below), rather than performing the control action itself. That is, the risk agent 26 may simply initiate a control action which is actually performed by separate software within the management station 20.

At 46, the risk agent 26 monitors computer system activity of a privileged user to detect initiation of a sensitive computer system operation. At 48, the risk agent 26 formulates and sends a query to the risk engine 28 which identifies the sensitive computer system operation and requests a risk assessment for it. At 50, the risk agent 26 receives a response to the query from the risk engine 28, and based on a risk assessment result in the response, takes (or initiates) an appropriate control action which is selected from a set of control actions available to the risk agent 26. The set of control actions typically include allowing the sensitive computer system operation to proceed; preventing the sensitive computer system operation from proceeding; issuing a notification that the sensitive computer operation is proceeding, and obtaining further confirmation as a condition to allowing the sensitive computer system operation to proceed. The operation may be allowed when the risk assessment result indicates a low level of risk for the operation, and the operation may be prevented when the risk assessment result indicates a high level of risk for the operation. Notifications may enable short-term corrective actions to prevent further damage, and may also have deterrent effects by increasing awareness of the occurrence of the sensitive computer operation. Alternatively for high risk operations, the risk agent 26 may obtain additional confirmation, such as by requesting further credentials from the privileged user or by contacting and obtaining clearance from a separate trusted person or system (e.g., a system administrator). Only if such clearance is obtained does the risk agent 26 permit the requested operation to be performed.

The following is a list of particular types of operations that might be deemed "sensitive" in the context of a SAN 10:

Mounting/dismounting disk drives (may lead to service disruption)

Deleting data and/or entire devices

Writing to files

Adding/removing a network device (may introduce unauthorized access channels)

Adding/removing another privileged user

Download or transfer of unusually higher volumes of data (e.g., that exceed a certain threshold defined in the risk engine)

The risk assessment result from the risk engine 28 may indicate a high level of risk if the sensitive computer system operation is an unusual operation not normally performed by the privileged user, or if it has special potential for causing disruption to a service provided by the computer system. Examples have been discussed.

Beyond an identification of the operation, the query from the agent 26 may also include other information potentially relevant to a risk assessment, such as an identification of the privileged user, information describing whether the privileged user is logged in locally or remotely and the type of remote connection if applicable, etc.

The system as depicted in FIG. 1 may reside entirely within one operational domain or distributed across multiple domains. In particular, some organizations (for example larger organizations with an extensive information technology (IT) infrastructure) may prefer that the risk engine 28 and risk model 30 be managed and operated by the organization itself. As an alternative, the risk engine 28 and risk model 30 may be part of a platform that provides risk assessment services to separate client systems such as SAN 10 or similar computer systems. This latter configuration is sometimes referred to as a "hosted" or "software as service" configuration.

As previously mentioned, a security function employing a risk agent in conjunction with a risk engine and risk model may be used in other computer system environments and/or at other functional locations of a computer system. As an example, a risk agent could be used to enhance security in an operating system of a computer. There are a variety of operating system functions that may be deemed sensitive based on their capacity to substantially interfere with normal system operation. Some of these may be analogous to those discussed above, e.g., deleting data/devices or writing files. A risk agent can be included in the system to observe the use of operating system functions, generate queries and send them to a risk engine, and receive responses to the queries and take appropriate control actions. It will be appreciated that this type of protection may be directed at general operational integrity of the computer rather than any particular application executing on the computer. Such protection may be exclusive of or in addition to application-level protection such as described above.

Similarly, risk-assessment protection functionality can also be used at the level of a virtual machine monitor (or "hypervisor") or other similar system level software. In this application, the sensitive operations will generally include operations specific to virtual machine (VM) systems, such as the creating, deleting, or moving/copying of entire VMs. Protection at the level of a virtual machine monitor can be in addition to protection(s) at the application and/or operating system levels. In this as well as other embodiments, a computer system being protected by the technique may include as few as one computer (e.g., an individual personal computer, server or other computerized device).

While various embodiments of the invention have been particularly shown and described, it will be understood by those skilled in the art that various changes in form and details may be made therein without departing from the scope of the invention as defined by the appended claims.

What is claimed is:

1. A method of protecting a computer system against potentially harmful activity of a privileged user authorized to perform sensitive computer system operations which non-privileged users of the computer system are not authorized to perform, the method comprising:

deploying a risk agent in the computer system, the risk agent being communicatively coupled to a risk engine, the risk engine being operative in response to queries from the risk agent to perform rules-based risk assessments of activities identified in the queries and to provide responses conveying risk assessment results; and operating the risk agent in the computer system to:

(a) identify a user as one of a privileged user and a non-privileged user, the privileged user being authorized to perform sensitive computer system operations the non-privileged user is not authorized to perform;

(b) when the user is identified as the non-privileged user, refrain from performing a monitoring action that includes monitoring computer system activity of the user;

(c) when the user is identified as the privileged user, then (i) perform the monitoring action to monitor computer system activity of the privileged user to detect initiation of a sensitive computer system operation, and (ii) identify the computer system operation as one of a sensitive computer system operation and a non-sensitive computer system operation, the sensitive computer system operation being either an unusual operation not normally performed by the privileged user or having special potential for causing disruption to a service provided by the computer system, the non-sensitive computer system operation normally being performed by the privileged user and lacking special potential for causing disruption to the service provided by the computer system;

(d) when the computer system operation is identified as the non-sensitive computer system operation during the monitoring, then allow the computer system operation to proceed and refrain from performing an assessment to determine whether the computer system operation exceeds a predetermined criteria of riskiness;

(e) when the computer system operation is identified as the sensitive computer system operation during the monitoring, then perform the assessment to determine whether the sensitive computer system operation exceeds the predetermined criteria of riskiness, and if not then (i) allow the sensitive computer system operation to proceed and (ii) refrain from performing an additional security related processing; and (f) when the sensitive computer system operation is determined to exceed the predetermined criteria of riskiness, then perform the additional security related processing by:
   (1) formulating and sending a query to the risk engine requesting risk assessment for the sensitive computer system operation,
   (2) receiving a response to the query from the risk engine, and
   (3) based on a risk assessment result in the response, selecting one of a set of control actions and performing the selected control action, the set of control actions including allowing the sensitive computer system operation to proceed, preventing the sensitive computer system operation from proceeding, issuing a notification that the sensitive computer operation is proceeding, and obtaining further confirmation as a condition to allowing the sensitive computer system operation to proceed.

2. A method according to claim 1, wherein the computer system is a storage area network, the privileged user is a storage area network administrator, and the sensitive computer system operation is one of a set of predetermined administrative storage-related operations, the set including mounting or dismounting a disk drive; deleting data of the non-privileged user; writing to a file of the non-privileged user; and deleting an entire storage device.

3. A method according to claim 2, wherein the storage-related operation is selected from the group consisting of mounting or dismounting a disk drive; deleting user data and/or an entire storage device; and writing to files stored on storage devices of the storage area network.

4. A method according to claim 1, wherein the computer system includes an operating system and the sensitive computer system operation is a function provided by the operating system.

5. A method according to claim 4, wherein the function provided by the operating system is selected from the group consisting of deleting user data and/or storage devices; and writing data to files included in a file system of the operating system.

6. A method according to claim 1, wherein the computer system includes a virtual machine monitor and the sensitive computer system operation is a function provided by the virtual machine monitor.

7. A method according to claim 6, wherein the function provided by the virtual machine monitor is selected from the group consisting of creating a virtual machine; deleting a virtual machine; and moving or copying a virtual machine.

8. A method according to claim 1, wherein the risk agent is one of a plurality of risk agents in the computer system, each risk agent operating at a respective one of distinct operating layers of the computer system, the operating layers including at least an application layer and an operating system layer, each risk agent communicating with a respective one of distinct risk engines using respective distinct risk models each tailored for the respective operating layer.

9. A method according to claim 8, wherein the operating layers further include a virtual machine monitor layer, and the risk agents include a risk agent operating at the virtual machine monitor layer.

10. A method according to claim 1, wherein obtaining further confirmation as a condition to allowing the sensitive computer system operation to proceed includes (i) selecting one of set of confirmation actions including requesting further credentials from the privileged user and obtaining clearance from a separate trusted system user, and (ii) performing the selected confirmation action.

11. A computer for use in a computer system, comprising:
memory;
one or more processors;
input/output circuitry for connecting the computer to a risk engine, the risk engine being operative in response to queries from a risk agent of the computer to perform model-based risk assessments of activities identified in the queries and to provide responses conveying risk assessment results;
one or more data buses coupling the memory, processors and input/output circuitry together; and
computer instructions stored in the memory and executable by the processors to cause the computer to perform a method of protecting the computer system against potentially harmful activity of a privileged user authorized to perform sensitive computer system operations which non-privileged users of the computer are not authorized to perform, the method including:
(a) identifying a user as one of a privileged user and a non-privileged user, the privileged user being authorized to perform sensitive computer system operations the non-privileged user is not authorized to perform;
(b) when the user is identified as the non-privileged user, refraining from performing a monitoring action that includes monitoring computer system activity of the user;
(c) when the user is identified as the privileged user, then (i) performing the monitoring action to monitor computer system activity of the privileged user to detect initiation of a sensitive computer system operation, and (ii) identifying the computer system operation as one of a sensitive computer system operation and a non-sensitive computer system operation, the sensitive computer system operation being either an unusual operation not normally performed by the privileged user or having special potential for causing disruption to a service provided by the computer system, the non-sensitive computer system operation normally being performed by the privileged user and lacking special potential for causing disruption to the service provided by the computer system;
(d) when the computer system operation is identified as the non-sensitive computer system operation during the monitoring, then allowing the computer system operation to proceed and refraining from performing an assessment to determine whether the computer system operation exceeds a predetermined criteria of riskiness;
(e) when the computer system operation is identified as the sensitive computer system operation during the monitoring, then performing the assessment to determine whether the sensitive computer system operation exceeds the predetermined criteria of riskiness, and if not then (i) allowing the sensitive computer system operation to proceed and (ii) refraining from performing an additional security related processing; and
(f) when the sensitive computer system operation is determined to exceed the predetermined criteria of riskiness, then performing the additional security related processing by:
   (1) formulating and sending a query to the risk engine requesting risk assessment for the sensitive computer system operation;

(2) receiving a response to the query from the risk engine; and (3) based on a risk assessment result in the response, selecting one of a set of control actions and performing the selected control action, the set of control actions including allowing the sensitive computer system operation to proceed, preventing the sensitive computer system operation from proceeding, issuing a notification that the sensitive computer operation is proceeding, and obtaining further confirmation as a condition to allowing the sensitive computer system operation to proceed.

12. A computer according to claim 11, wherein the computer system is a storage area network, the privileged user is a storage area network administrator, and the sensitive computer system operation is a one of a set of predetermined administrative storage-related operations, the set including mounting or dismounting a disk drive; deleting data of the non-privileged user; writing to a file of the non-privileged user; and deleting an entire storage device.

13. A computer according to claim 12, wherein the storage-related operation is selected from the group consisting of mounting or dismounting a disk drive; deleting user data and/or an entire storage device; and writing to files stored on storage devices of the storage area network.

14. A computer according to claim 11, wherein the memory further includes additional computer instructions constituting an operating system of the computer, and wherein the sensitive computer system operation is a function provided by the operating system.

15. A computer according to claim 14, wherein the function provided by the operating system is selected from the group consisting of deleting user data and/or storage devices; and writing data to files included in a file system of the operating system.

16. A computer according to claim 11, wherein the memory further includes additional computer instructions constituting a virtual machine monitor of the computer, and wherein the sensitive computer system operation is a function provided by the virtual machine monitor.

17. A computer according to claim 16, wherein the function provided by the virtual machine monitor is selected from the group consisting of creating a virtual machine; deleting a virtual machine; and moving or copying a virtual machine.

18. A computer according to claim 11, wherein the risk agent is one of a plurality of risk agents in the computer, each risk agent operating at a respective one of distinct operating layers of the computer, the operating layers including at least an application layer and an operating system layer, each risk agent communicating with a respective one of distinct risk engines using respective distinct risk models each tailored for the respective operating layer.

19. A computer according to claim 18, wherein the operating layers further include a virtual machine monitor layer, and the risk agents include a risk agent operating at the virtual machine monitor layer.

20. A computer according to claim 11, wherein obtaining further confirmation as a condition to allowing the sensitive computer system operation to proceed includes (i) selecting one of set of confirmation actions including requesting further credentials from the privileged user and obtaining clearance from a separate trusted system user, and (ii) performing the selected confirmation action.

* * * * *